(12) United States Patent
Kitamura et al.

(10) Patent No.: US 9,060,051 B2
(45) Date of Patent: Jun. 16, 2015

(54) SEMI-AUTOMATIC HINGE WITH ROTATIONAL ANGLE RESTRICTING MECHANISM

(75) Inventors: Kiichiro Kitamura, Ichihara (JP); Hitoshi Sato, Ichihara (JP)

(73) Assignee: MITSUBISHI STEEL MFG. CO., LTD., Chuo-ku, Tokyo (JP)

(*) Notice: Subject to any disclaimer, the term of this patent is extended or adjusted under 35 U.S.C. 154(b) by 524 days.

(21) Appl. No.: 12/998,530

(22) PCT Filed: Nov. 19, 2009

(86) PCT No.: PCT/JP2009/069628
§ 371 (c)(1),
(2), (4) Date: Apr. 28, 2011

(87) PCT Pub. No.: WO2010/061776
PCT Pub. Date: Jun. 3, 2010

(65) Prior Publication Data
US 2011/0203077 A1    Aug. 25, 2011

(30) Foreign Application Priority Data
Nov. 27, 2008  (JP) ................ 2008-302550

(51) Int. Cl.
*E05D 11/08* (2006.01)
*H04M 1/02* (2006.01)

(52) U.S. Cl.
CPC .......... *H04M 1/0216* (2013.01); *Y10T 16/5387* (2015.01); *Y10T 16/5385* (2015.01)

(58) Field of Classification Search
CPC ................... E05D 3/02; E05D 11/08

USPC .............. 16/348, 305, 330, 303, 297
See application file for complete search history.

(56) References Cited

U.S. PATENT DOCUMENTS

| | | | |
|---|---|---|---|
| 7,707,688 B2* | 5/2010 | Ishikawa et al. | 16/303 |
| 7,814,619 B2* | 10/2010 | Kuwajima et al. | 16/303 |
| 7,818,845 B2* | 10/2010 | Hu et al. | 16/330 |
| 8,079,115 B2* | 12/2011 | Zhang et al. | 16/326 |
| 8,245,354 B2* | 8/2012 | Duan et al. | 16/303 |
| 2006/0101618 A1* | 5/2006 | Minami et al. | 16/303 |
| 2006/0112517 A1* | 6/2006 | Luo et al. | 16/330 |

(Continued)

FOREIGN PATENT DOCUMENTS

| | | |
|---|---|---|
| JP | 03-125773 | 5/1991 |
| JP | 05-026227 | 2/1993 |

(Continued)

OTHER PUBLICATIONS

Office Action of the Japanese Patent Office with English translation of Concise Explanation of Relevance dated Oct. 19, 2012 (4 pages).

*Primary Examiner* — Emily Morgan
(74) *Attorney, Agent, or Firm* — Flynn, Thiel, Boutell & Tanis, P.C.

(57) ABSTRACT

A single-shaft semi-automatic hinge, wherein a first cam and a second cam fitted on the single shaft of the hinge passing therethrough are abutted on each other with pressure application by an elastic member, thereby generating a rotational friction torque; a region of the first cam and the second cam in which a liquid crystal portion can rotate from a state in which a main body portion and the liquid crystal portion are folded to a fully open state is set narrower than a region in which the hinge can rotate.

3 Claims, 14 Drawing Sheets

(56) References Cited

U.S. PATENT DOCUMENTS

| | | | |
|---|---|---|---|
| 2007/0089272 A1* | 4/2007 | Kuwajima et al. | 16/303 |
| 2007/0136992 A1* | 6/2007 | Lu et al. | 16/330 |
| 2007/0294859 A1* | 12/2007 | Hsu et al. | 16/330 |
| 2008/0092335 A1* | 4/2008 | Hu et al. | 16/308 |
| 2008/0128156 A1* | 6/2008 | Kuwajima et al. | 174/161 R |
| 2010/0162526 A1* | 7/2010 | Duan et al. | 16/303 |
| 2011/0067203 A1* | 3/2011 | Duan et al. | 16/297 |
| 2011/0254417 A1* | 10/2011 | Duan et al. | 312/319.2 |
| 2012/0206872 A1* | 8/2012 | Duan et al. | 361/679.01 |

FOREIGN PATENT DOCUMENTS

| | | |
|---|---|---|
| JP | 08-065369 | 3/1996 |
| JP | 10-051526 | 2/1998 |
| JP | 2796275 | 6/1998 |
| JP | 3249757 | 11/2001 |
| JP | 2003-065321 | 3/2003 |
| JP | 2003-134203 | 5/2003 |
| JP | 2003-214423 | 7/2003 |
| JP | 2003-247532 | 9/2003 |
| JP | 2004-011718 | 1/2004 |
| JP | 2004-019795 | 1/2004 |
| JP | 2004-138184 | 5/2004 |
| JP | 2004-183698 | 7/2004 |
| JP | 2004-278659 | 10/2004 |
| JP | 2006-138400 | 6/2006 |
| JP | 3883607 | 11/2006 |
| JP | 2008-075825 | 4/2008 |
| JP | 2008-275048 | 11/2008 |
| JP | 2008-303991 | 12/2008 |
| WO | WO 2005-010378 | 2/2005 |
| WO | WO 2007-069302 | 6/2007 |

* cited by examiner (a)　　　　　　　　　(b)

(a)

(b)

SEMI-AUTOMATIC HINGE WITH ROTATIONAL ANGLE RESTRICTING MECHANISM

TECHNICAL FIELD

The present invention relates to a single-shaft hinge for use in a portable electronic device in which a main body portion and a liquid crystal portion can be folded, and more particularly to a semi-automatic hinge having a function of automatically fully opening the liquid crystal portion earlier than in the conventional hinges of this type when the liquid crystal portion is opened from a folded and completely closed state.

BACKGROUND ART

In the presently manufactured portable electronic device in which a main body portion and a liquid crystal portion can be folded, a hinge function is actuated and an opening-closing operation is performed automatically when the liquid crystal portion is opened to a predetermined angle from a closed state.

In particular, the hinge for a cellular phone is configured such that when a telephone conversation, mail, or camera function is realized from a state in which the liquid crystal portion is closed, the liquid crystal portion is opened by inserting a finger into a gap between the main body portion and the liquid crystal portion or pinching and lifting the liquid crystal portion with a hand. In presently manufactured typical products, after the liquid crystal portion is opened from a rotation start (central angle 0°) to a central angle of 70° to 90°, the hinge function is actuated and the liquid crystal portion is automatically opened. In the presently manufactured typical products, the maximum opening angle is set close to a central angle of 165°.

Further, in most products, where the liquid crystal portion is tilted from the completely opened position in the closing direction and the hinge is rotated when the liquid crystal portion is closed, the liquid crystal portion is automatically closed from a vicinity of about 70° to 60°.

Thus, in the presently used single-shaft hinge, a hinge shaft is passed through a first cam and a second cam (usually called "sliding cam") having formed therein large sliding slanted surfaces on the left and right sides with respect to a protrusion apex as a center in such a configuration that the sliding surface of the second cam faces a protrusion of the first cam, the second cam is impelled by the repulsion force of a compression coil spring, and a rotational sliding torque is generated between the first cam and the second cam.

In most presently used single-shaft hinges, a 180-degree symmetrical cam is used in which concave-convex surfaces are formed in four locations for every 90° in the circumferential 360° direction of the sliding cam in order to realize a variety of functions such as a 360° rotation and clockwise-counterclockwise rotation of the hinge.

This is a mechanism in which, at the abutment surface of the sliding cam, apexes and concave-convex surfaces such as slanted surfaces are formed symmetrically and precisely at 180°. In such a mechanism, the rotation torque caused by friction of abutment surfaces of the cams changes depending on the spring force and position of the concave-convex surface for every 90°.

As for the opening-closing angle of the liquid crystal portion and the arrangement of concaves and convexes on the sliding cam, a minimum torque value is attained when abutment is realized in the concave portion of the sliding cam in the arrangement of concave-convex surfaces. Therefore, this position is designed at a central angle of 0° (fully closed state) or 180° (fully open state).

Further, since the torque value is usually at maximum in the apex of the convex portion reached by rotation through 90°, the vicinity of this position is taken as an operation initiation portion when the liquid crystal portion is automatically opened and closed.

Configurations described in Patent Documents 1 to 4 are disclosed as portable electronic devices using such a hinge. A configuration described in Patent Document 5 in which a friction function is added to the hinge function to change the torque characteristic and a configuration described in Patent Document 6 in which the rotation angle is limited to a maximum of 180° by adding a rotational angle restricting mechanism have been suggested as configurations additionally including special characteristics.

PRIOR ART DOCUMENTS

Patent Documents

Patent Document 1: Japanese Patent Application Publication No. H5-26227
Patent Document 2: Japanese Patent No. 2796275
Patent Document 3: Japanese Patent No. 3249757
Patent Document 4: Japanese Patent No. 3883607
Patent Document 5: Japanese Patent Application Publication No. 2004-183698
Patent Document 6: Japanese Patent Application Publication No. 2004-278659

DISCLOSURE OF THE INVENTION

Problems that the Invention is to Solve

It is an object of the present invention to provide a single-shaft semi-automatic hinge for a portable electronic device, such as a cellular phone, in which an angle at which the liquid crystal portion in the portable electronic device is automatically opened can be made less than a central angle of 70° to 90° of the conventional portable electronic device.

Another object is to provide a semi-automatic hinge which has long service life and high endurance even when hinge components such as cams demonstrate deterioration with time that is caused by the use of the portable electronic device, stresses caused by impacts or falls, etc.

Further, it is preferred that the angle at which opening is automatically started be equal to or less than half of the central angle of 70° to 90°, and the angle at which closing is automatically started be equal to or less than half of 70° to 60°.

Means for Solving the Problems

To achieve the above objects, the present invention has employed the configuration described below.

(1) The present invention provides a single-shaft semi-automatic hinge for a portable electronic device in which a main body portion and a liquid crystal portion can be folded, wherein a first cam and a second cam fitted on the single shaft of the hinge passing therethrough are abutted on each other with pressure application by an elastic member, thereby generating a rotational friction torque; a region of the first cam and the second cam in which the liquid crystal portion can rotate from a state in which the main body portion and the liquid crystal portion are folded to a fully open state is set narrower than a region in which the hinge can rotate; a protruding body is formed on an abutment surface of the first cam; in a central angle range of 0° to 180° of an abutment surface of the second cam, a notched portion is formed at 0° and then a slanted surface, a convex top portion, a highly slanted surface, a slanted descending surface, and a deep valley portion are formed successively in the rotation direction in the order of description from the rotation start site and the convex top portion is provided at a central angle of less than 50°; and a rotational angle restricting function, which prevents the protruding body of the first cam from sliding down into the notched portion of the second cam when the main body portion and the liquid crystal portion are folded, is formed between a central angle of 0° and the convex top portion in which the first and second cams have respectively the same concave-convex shapes as the above with 180° symmetry.

(2) The present invention provides the semi-automatic hinge described in clause (1) above, wherein the single shaft of the semi-automatic hinge is a hinge shaft having a flange formed at one end thereof; the hinge shaft is inserted in a housing; the hinge shaft is passed through at least the first cam, the second cam, and the elastic member; the second cam is locked to the housing so as to be rotatable synchronously with the housing; and the rotational angle restricting function is generated by collision of a first rotational angle restricting protrusion formed at the flange of the hinge shaft and a second rotational angle restricting protrusion formed on the surface opposite the abutment surface of the first cam, thereby preventing the protruding body of the first cam from sliding down into the notched portion of the second cam.

A coil spring, a plate spring, and a disc spring can be used as the elastic member. A coil spring is especially preferred.

(3) The present invention provides the semi-automatic hinge described in clause (1) above, wherein the single shaft of the hinge in the semi-automatic hinge is passed through at least the first cam, the second cam, and the elastic member; the hinge shaft is inserted into a housing; the second cam is locked to the housing so as to be rotatable synchronously with the housing; and the rotational angle restricting function is generated by collision of a first rotational angle restricting protrusion formed at an axial circumferential surface of the hinge shaft and a second rotational angle restricting protrusion formed on the surface opposite the abutment surface of the second cam, thereby preventing the protruding body of the first cam from sliding down into the notched portion of the second cam.

(4) The present invention provides the semi-automatic hinge described in clause (1) above, wherein the single shaft of the hinge in the semi-automatic hinge is passed through at least the first cam, the second cam, the elastic member, a rotational angle restricting rotating cam, and a rotational angle restricting fixed cam; the single shaft of the hinge is inserted into a housing; the second cam is locked to the housing so as to be rotatable synchronously with the housing; the rotational angle restricting function is generated by abutment of the rotational angle restricting rotating cam and the rotational angle restricting fixed cam; the rotational angle restricting rotating cam is externally rotatably fitted onto the hinge shaft, and has concave-convex surfaces formed alternately in a radial direction of the abutment surface in a groove provided circumferentially; the rotational angle restricting fixed cam is externally fitted on the hinge shaft so as to rotate synchronously therewith, and has alternately concave-convex surfaces in a groove provided on a circumference of the abutment surface; and a rotational angle allowed region of the hinge is restricted by collision of the convex surfaces of the rotational angle restricting rotating cam and the rotational angle restricting fixed cam, thereby preventing the protruding body of the first cam from sliding down into the notched portion of the second cam.

(5) The present invention provides the semi-automatic hinge described in any of clauses (1) to (4) above, wherein the slanted surface, the convex top portion, the highly slanted surface, the slanted descending portion, and the deep valley portion are disposed with 180° symmetry along the radial circumference; and the convex top portion of the second cam is disposed at two positions with a central angle of 20° to 40° and 200° to 220°, and the deep valley portion is disposed at two positions with a central angle of 150° to 180° and 330° to 360°.

(6) The present invention provides the semi-automatic hinge described in clause (5) above, wherein the rotational angle restricting function is formed at two positions with a central angle of 0° to 15° and 180° to 195° with 180° symmetry.

The semi-automatic hinge in accordance with the present invention will be described below in greater detail.

In the single-shaft semi-automatic hinge for a portable electronic device in accordance with the present invention, a rotational friction torque is generated by abutting the first cam and the second cam against each other.

A region of the first cam and the second cam in which the liquid crystal portion can rotate from a state in which the main body portion and the liquid crystal portion are folded to a fully open state is set narrower than a region in which the hinge can rotate.

A protruding body is formed on an abutment surface of the first cam.

The first and second cams of the present application have cam shapes with concave-convex shapes of the same form disposed with 180° symmetry. Therefore, the explanation of rotational angle representation below will be limited to a range of 0° to 180°.

In the central angle range of 0° to 180° of the abutment surface of the second cam, a notched portion is formed at 0° and then a slanted surface, a convex top portion, a highly slanted surface, a slanted descending surface, and a deep valley portion are formed successively in the rotation direction in the order of description from the rotation start site, and the convex top portion is provided at a central angle of less than 50°.

The automatic opening-closing angle can be reduced by setting the convex surface (convex top portion) in the abutment surface of the second cam where the maximum rotation torque is generated at a central angle of less than 50°.

More preferably, the convex top portion of the second cam is disposed at a position with a central angle of 20° to 40°, and the deep valley portion is disposed at a position with a central angle of 150° to 180°.

With the conventional products, it is necessary to hold, for example, the cellular phone in the left hand and perform the operation of opening and closing the liquid crystal portion with the right hand. By contrast, with the above-described configuration, the liquid crystal portion can be automatically opened by an operation of inserting a left hand finger between the main body portion and the liquid crystal portion and lifting the liquid crystal portion with the finger. The automatic opening-closing angle can be reduced by bringing the convex top portion of the second cam where the maximum rotation torque is generated close to the concave surface (0°) of the notched portion and setting the convex top portion of the second cam to a central angle of 20° to 40°.

By using such a semi-automatic hinge, it is possible to perform quickly the operation of opening and closing the liquid crystal portion in a portable electronic device such as a cellular phone and the convenience of use can be greatly improved.

However, in order to obtain such a configuration, it is necessary to create a torque variation that is larger than that in the conventional device over the entire rotation angle range (0° to 180°). For this purpose, it is necessary to increase the inclination of the sliding slanted surface of the second cam and also increase the difference in height of the groove between the concave-convex portions. In accordance with the present invention, the convex top portion is formed at a central angle of less than 50° and a slanted descending surface is formed in the zone of connection to the deep valley portion. In the conventional products, the concave-convex portion is formed for every 90°, but the configuration in accordance with the present invention has a left-right asymmetry and the greatly slanted surface is formed within a range from 0° to the convex top portion.

In the semi-automatic hinge in accordance with the present invention, the rotational angle restricting function, which prevents the protruding body of the first cam from sliding down into the notched portion of the second cam when the main body and the liquid crystal portion are folded, is formed within a range of from a central angle of 0° to the convex top portion. It is especially preferred that the rotational angle restricting function be formed at a position of 0° to 15°.

Where the angle of automatic opening and closing is brought close to the central angle of 0°, the following technical problem is encountered. Thus, in the semi-automatic hinge in accordance with the present invention, the sliding surface of the second cam is close to 0° and has a greatly slanted surface at the notched portion (0°) side. When a portable device is dropped on a floor or the like in a state with a completely closed liquid crystal portion, the housing of the portable electronic device is deformed and sliding of the cam that was not assumed at a design stage can occur. Also, play occurs due to wear or damage of components caused by opening and closing operations of the hinge. The problem resulting from such sliding or play is that the protruding body of the first cam slides down into a steep notched portion (groove) of the second cam disposed at 0°.

When the protruding body of the first cam thus slides down into the notched portion at the abutment surface of the second cam, the protruding body of the first cam becomes fitted tightly into the groove of the second cam.

As a result, shaft rotation is impossible. It is also possible that the components be deformed by one such downward sliding so that the downward sliding will easily occur again. Therefore, the cellular phone can become very inconvenient in use.

As a means for resolving this problem, it is preferred that the rotational angle restricting function be formed at a position within a range from a central angle of 0° to the convex top portion. It is even more preferred that the rotational angle restricting function be formed at a position with a central angle of 0° to 15°.

The rotational angle restricting function of the hinge in accordance with the present invention will be explained below. FIG. 17 is a conceptual drawing illustrating the above-described torque generating function and rotational angle restricting function realized by abutment of the first cam and the slanted surface of the second cam in relation to the rotational angle.

In the semi-automatic hinge in accordance with the present invention, a downward sliding preventing mechanism acts between the rotating shaft and the first cam in the configuration according to the invention described in clause (2) above, between the rotating shaft and the second cam in the configuration according to the invention described in clause (3) above, and between the rotational angle restricting rotating cam and the rotational angle restricting fixed cam in the configuration according to the invention described in clause (4) above, and the function of preventing the protruding body of the first cam from sliding down into the notched portion of the second cam is demonstrated.

FIG. 17 is a conceptual drawing illustrating the rotational angle and abutment positions of the cams. The zone before point A is a notched portion leading to the deep valley portion, the zone between A and C is a rotation start site, the zone between C and D is the convex top portion, the zone between D and E is the slanted descending surface, and point E is the deep valley portion.

When the protruding body 2-1 of the first cam 2 moves in the direction of A-C-D-E of the second cam, the hinge is opened, and where the protrusion 2-1 of the first cam 2 passes point D, the protrusion enters the operation region in which the hinge is opened automatically.

FIG. 17 shows a state in which the protruding body of the first cam is located in the intermediate point B at the slanted surface A-C of the second cam. The above-described downward sliding preventing mechanism is actuated in this position and the protruding body is prevented from moving or downward sliding in the direction of the notched portion toward A.

Referring to FIG. 17, the rotational angle position of the state in which the hinge is closed is identical to that at which the downward sliding preventing function is actuated, and when the hinge thereafter opens, this position becomes the initial rotation start position.

When the semi-automatic hinge according to the present invention is incorporated in a cellular phone or the like, the hinge is disposed at an offset angle at which the position that is somewhat rotated with respect to the rotational angle restriction value is the initial rotation start position, and in a general mode of use other than dropping or the like situations, the rotational angle restricting mechanism may be in a passive state.

Effects of the Invention

The effect demonstrated by the present invention is that a single-shaft semi-automatic hinge for a portable electronic device is provided in which an angle at which the liquid crystal portion in the portable electronic device is automatically opened is made less than a central angle of 70° to 90° of the conventional cellular phone or the like, this hinge having long service life and high endurance.

Another effect is that the angle of automatic opening is equal to or less than half of the central angle of 70° to 90°, and the angle at which closing is automatically started is equal to or less than half of 70° to 60°.

BRIEF DESCRIPTION OF THE DRAWINGS

FIG. 3(a) is a lateral cross-sectional view and FIG. 3(b) is a vertical cross-sectional view.

FIG. 4(a) is a front view and FIG. 4(b) is a right side view.

FIG. 5 shows the structure of the second cam according to Embodiment 1.

FIG. 6(a) is a left side view, FIG. 6(b) is a front view, and FIG. 6(c) is a plan view.

FIG. 7(a) is a front transparent view showing the internal state, and FIG. 7(b) and FIG. 7(c) are right side views illustrating the generation of the rotational angle restricting function in the rotation of the first cam and the hinge shaft.

FIG. 9(a) is a front view and FIG. 9(b) is a right side view.

FIG. 10(a) is a left side view and FIG. 10(b) is a front view.

FIG. 11(a) is a front view and FIG. 11(b) is a right side view.

FIG. 12(a) is a front transparent view showing the internal state, FIG. 12(b) is a left side view illustrating the generation of the rotation angle restricting function in the rotation of the second cam and the hinge shaft, FIG. 12(c) is a front transparent view illustrating the internal state in the rotation start site, and FIG. 12(d) is a schematic diagram illustrating, from the fixing plate side, the state in which the rotational angle restricting mechanism shown in FIG. 12(c) has operated.

FIG. 14(a) is a cross-sectional view of the housing, FIG. 14(b) is a right side view of the housing, FIG. 14(c) is a front view of the hinge shaft, and FIG. 14(d) is a right side view of the hinge shaft.

FIG. 15(a) is a plan view of the rotational angle restricting fixed cam 58, FIG. 15(b) is a side view of the rotational angle restricting fixed cam 58, FIG. 15(c) is a plan view of the rotational angle restricting rotating cam 59, FIG. 15(d) is a side view of the rotational angle restricting rotating cam 59, FIG. 15(e) is a front view of a torque plate 60, and FIG. 15(f) is a side view of the torque plate.

FIG. 16(a) and FIG. 16(b) illustrate a downward slip preventing method, and FIG. 16(c) illustrates an example of a hinge in which a free stop operation from 135° is added to the semi-automatic operation.

BEST MODE FOR CARRYING OUT THE INVENTION

The embodiments of the invention will be described below with reference to the appended drawings. The embodiments described below illustrate examples of the semi-automatic hinge in accordance with the present invention and place no limitation on the present invention.

Embodiment 1

Figure 1:
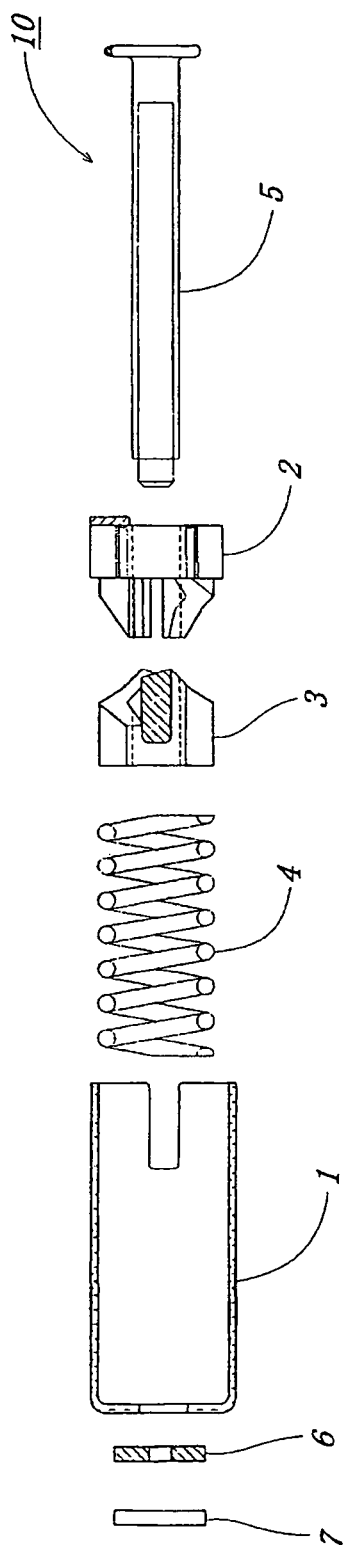
FIG. 1 is an exploded view illustrating the semi-automatic hinge according to Embodiment 1.

FIG. 1 is an exploded view illustrating a semi-automatic hinge 10 according to Embodiment 1.

As shown in FIG. 1, the semi-automatic hinge 10 according to the present embodiment is constituted by a housing 1, a first cam 2, a second cam 3, an elastic member (coil spring) 4, and a hinge shaft 5. The reference numeral 6 denotes a sliding ring, and the reference numeral 7 denotes a fixing plate.

The hinge shaft 5 is inserted into the housing 1, and the hinge shaft 5 is passed through the first cam 2 and the second cam 3. The coil spring 4 is disposed on the side opposite the abutment surface of the second cam 3 and impels a rotational torque by abutting the first cam 2 and the second cam 3 against each other.

Figure 2:
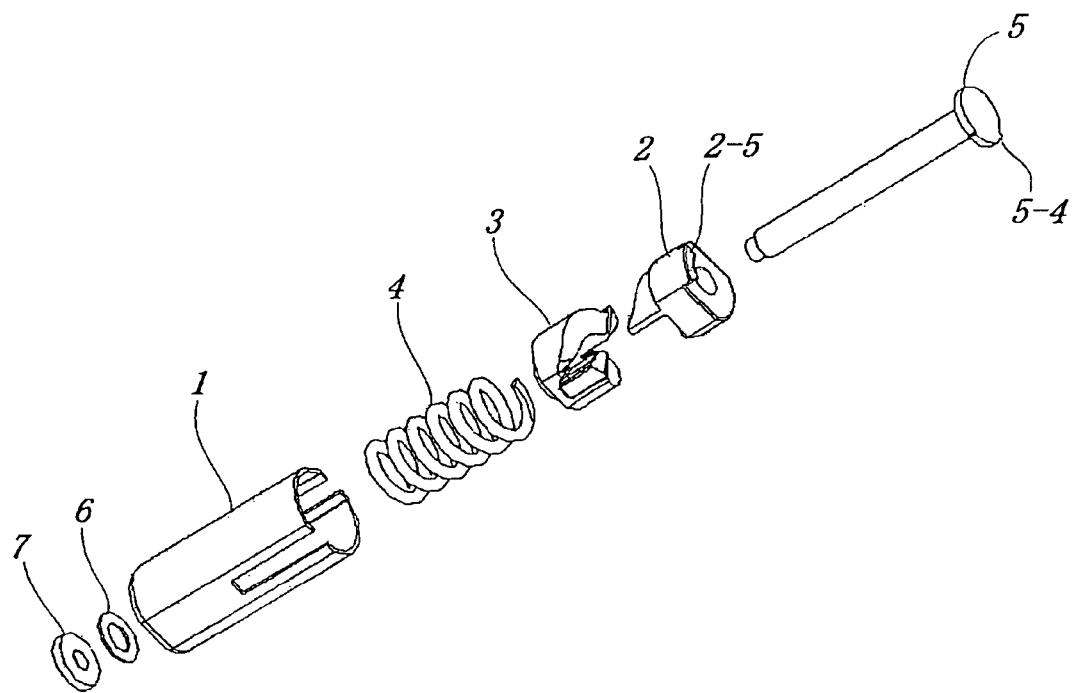
FIG. 2 is an exploded perspective view of the semi-automatic hinge according to Embodiment 1.

FIG. 2 is an exploded perspective view of the semi-automatic hinge 10 according to Embodiment 1.

As shown in FIG. 2, the hinge shaft 5 is successively passed through the first cam 2, the second cam 3, and the coil spring 4, the distal end of the hinge shaft 5 is inserted into a through hole provided in a side wall of the housing 1, a sliding ring 6 is externally fitted onto the hinge shaft, and the end portion of the hinge shaft is fixed by the fixing plate 7.

The second cam 3 is pressed by the coil spring 4 and locked so as to be rotatable synchronously with the housing 1, but can move in the axial direction.

Figure 3:
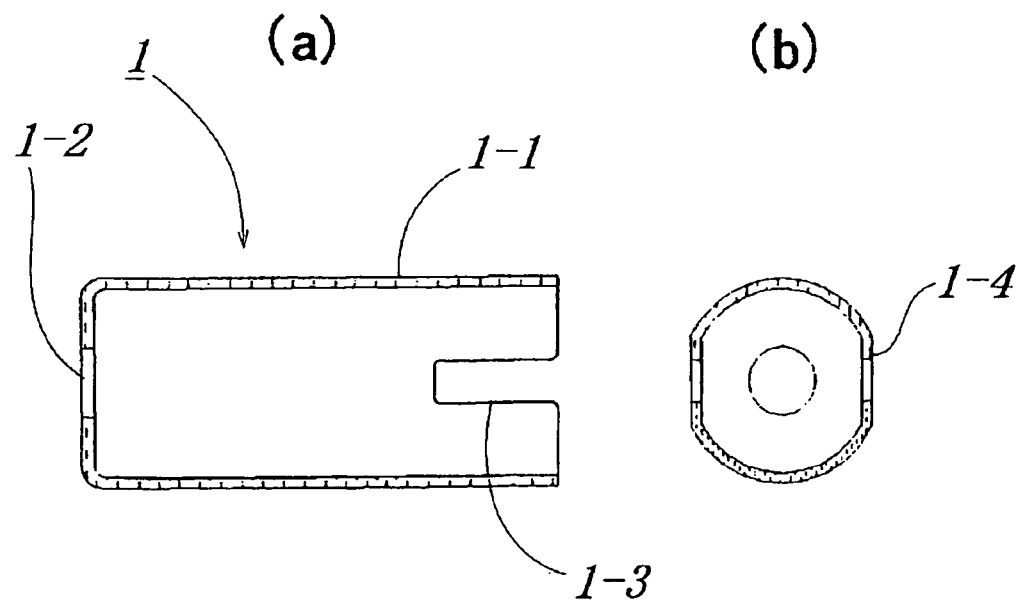
FIG. 3 is a cross-sectional view illustrating the structure of the housing according to Embodiment 1.

FIG. 3 is a cross-sectional view illustrating the structure of the housing 1. FIG. 3(a) is a lateral cross-sectional view and FIG. 3(b) is a vertical cross-sectional view.

As shown in FIG. 3(a), the housing 1 used in Embodiment 1 has a through hole 1-2 in the side wall for inserting the hinge shaft 5, and guide grooves 1-3 that guide the movement of the second cam 3 in the axial direction are provided in two locations on the circumferential surface of the opening of the housing 1.

Further, as shown in FIG. 3(b), the upper surface and bottom surface of the housing 1 are curved, but both side surfaces are flat and smooth portions 1-4.

Figure 4:
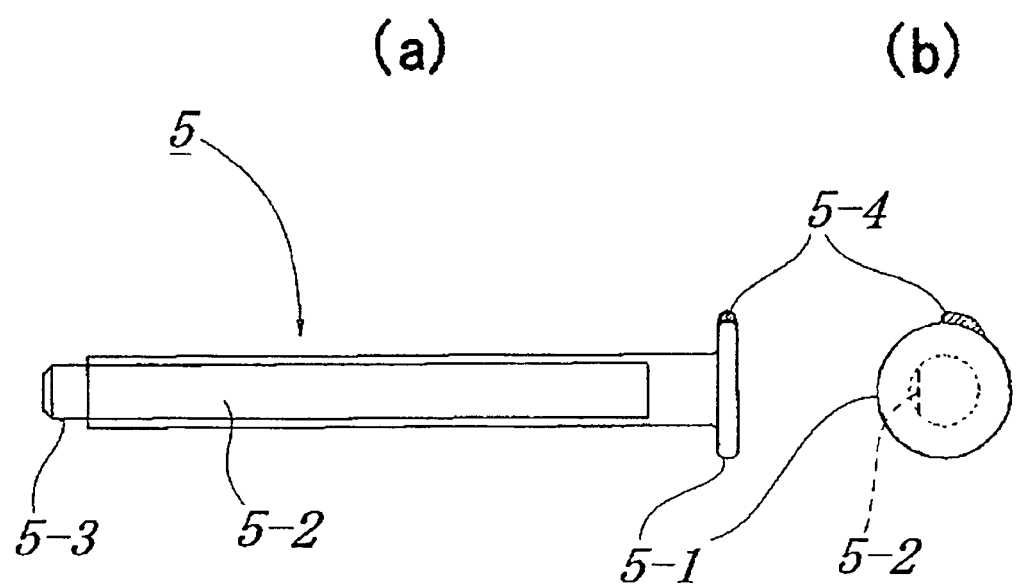
FIG. 4 illustrates the structure of the hinge shaft according to Embodiment 1.

FIG. 4 illustrates the structure of the hinge shaft 5. FIG. 4(a) is a front view and FIG. 4(b) is a right side view (partially viewable shape is shown by a dot line).

As shown in FIG. 4(a), the hinge shaft 5 used in Embodiment 1 has an end portion 5-3 that is inserted at the left side surface into the through hole provided in the side wall of the housing 1 and fixed by the fixing plate 7. The right side surface is a flange 5-1. Further, a D-cut sectional portion 5-2 is formed in part of the shaft.

As shown in FIG. 4(b), a first rotational angle restricting protrusion 5-4 is formed on the outer circumference of the flange 5-1 of the hinge shaft 5.

Figure 5A:
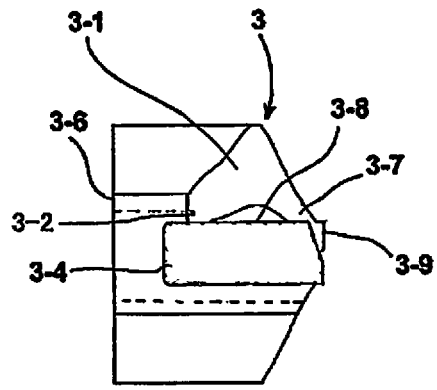
FIG. 5(a) is a front view.
Figure 5B:
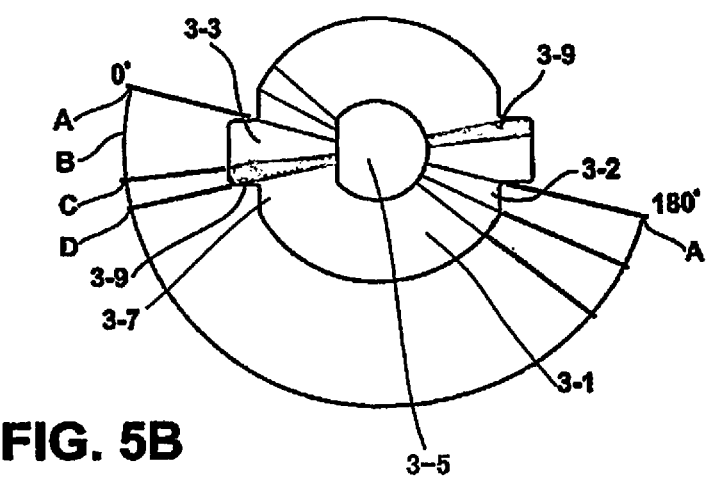
FIG. 5(b) is a plan view.
Figure 5C:
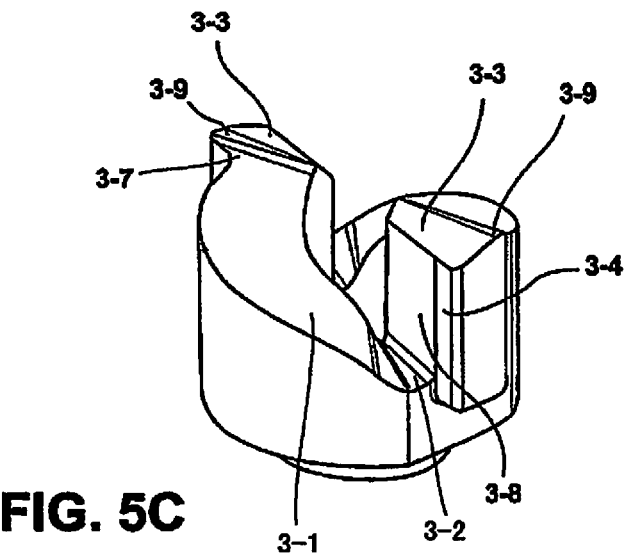
FIG. 5(c) is an isometric view.

FIG. 5 shows the structure of the second cam 3. FIG. 5(a) is a front view, FIG. 5(b) is a right side view, and FIG. 5(c) is a plan view.

As shown in FIG. 5(a), a sliding protrusion 3-4 that engages with the guide groove 1-3 of the housing 1 is formed in the side surface of the second cam 3 used in Embodiment 1. One side surface of the sliding protrusion 3-4 is a notched portion 3-8. A slanted surface 3-3, which is a rotation start zone, a convex top portion 3-9, a highly slanted surface 3-7, a slanted descending surface 3-1 and then a deep valley portion 3-2 are formed on the surface of the second cam that abuts on the first cam 2, and the coil spring 4 applies a repulsion force to the bottom portion 3-6 of the cam.

As shown in FIG. 5(b), when the closed housing 1 is opened, the protruding surface 2-1 of the first cam 2 slides successively in the counterclockwise direction about the slanted surfaces 3-3, 3-9, 3-7, 3-1, and 3-2 of the second cam 3.

Further, the axial center of the second cam 3 becomes an axial hole 3-5 of a D-cut shape and mates with the aforementioned D-cut sectional portion 5-2 of the hinge shaft 5. Thus, in Embodiment 1, the housing 1, the second cam 3, and the hinge shaft 5 are formed so as to rotate synchronously without a rotational play.

Further, as shown in FIG. 5(c), in the hinge, the below-described protruding body 2-1 of the first cam 2 slides down, while pressing the highly slanted surface 3-7 and the slanted descending surface 3-1 against the coil spring 4, thereby generating the torque that opens the housing 1.

As mentioned hereinabove, the convex top portion 3-9 in Embodiment 1 is formed at a central angle of 20° to 40°, and where the protruding body 2-1 of the first cam 2 passes by the convex top portion 3-9, an opening torque is generated in the highly slanted surface 3-7 and the slanted descending surface 3-1. Therefore, in a portable electronic device incorporating the semi-automatic hinge according to Embodiment 1, the automatic opening angle is equal to or less than half of the central angle 70° to 90°.

Figure 6:
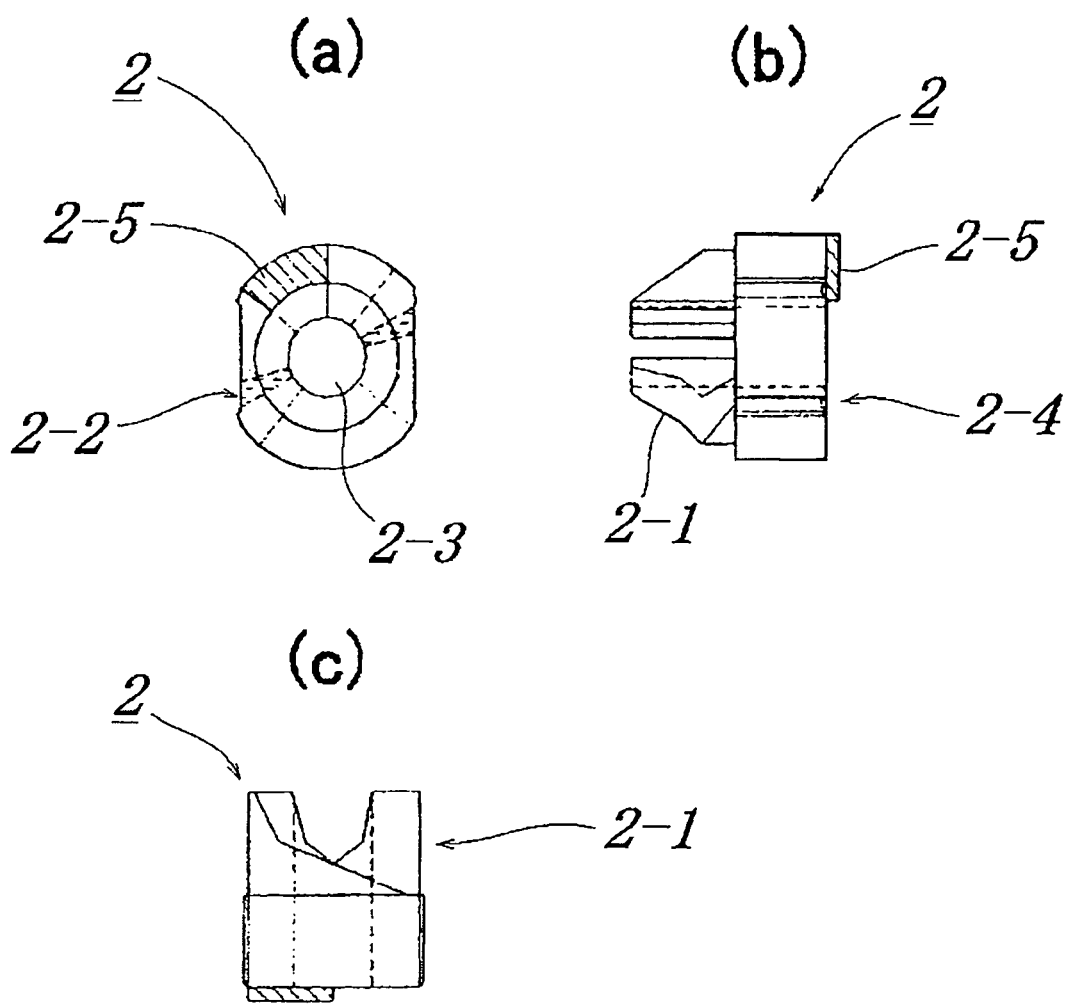
FIG. 6 illustrates the structure of the first cam according to Embodiment 1.

FIG. 6 illustrates the structure of the first cam 2. FIG. 6(a) is a left side view, FIG. 6(b) is a front view, and FIG. 6(c) is a plan view.

As shown in FIG. 6(a), the first cam 2 used in Embodiment 1 has a second rotational angle restricting protrusion 2-5 on the right side surface. The through hole 2-3 of the first cam 2 is formed in a cylindrical shape and enables the rotation with respect to the shaft portion of the aforementioned hinge shaft 5.

As shown in FIG. 6(b) and FIG. 6(c), the protruding bodies 2-1 are formed in two locations on the side opposite that of the abutment surface of the first cam 2. The protruding bodies 2-1 are locations of abutment on the aforementioned second cam 3.

The rotational angle restricting function is demonstrated when the first cam 2 and the flange 5-1 of the hinge shaft 5 rotate relative to each other, while abutting on each other, thereby thrusting the first rotational angle restricting protrusion 5-4, which is formed at the flange 5-1 of the hinge shaft 5 and disposed at the hinge shaft 5 rotating synchronously with the second cam 3, and the second rotational angle restricting protrusion 2-5, which is formed at the left side surface of the first cam 2, against each other.

The rotational angle restricting function is designed to be generated between a rotation angle of the second cam 3 of from the central angle 0° and the convex top portion 3-9 of the second cam 3. The effect produced by such collision of the first rotational angle restricting protrusion 5-4 and the second rotational angle restricting protrusion 2-5 is that the two protruding bodies 2-1 of the first cam 2 shown in FIG. 6(b) are prevented from sliding down toward the notched portion 3-8 of the second cam 3.

Figure 7:
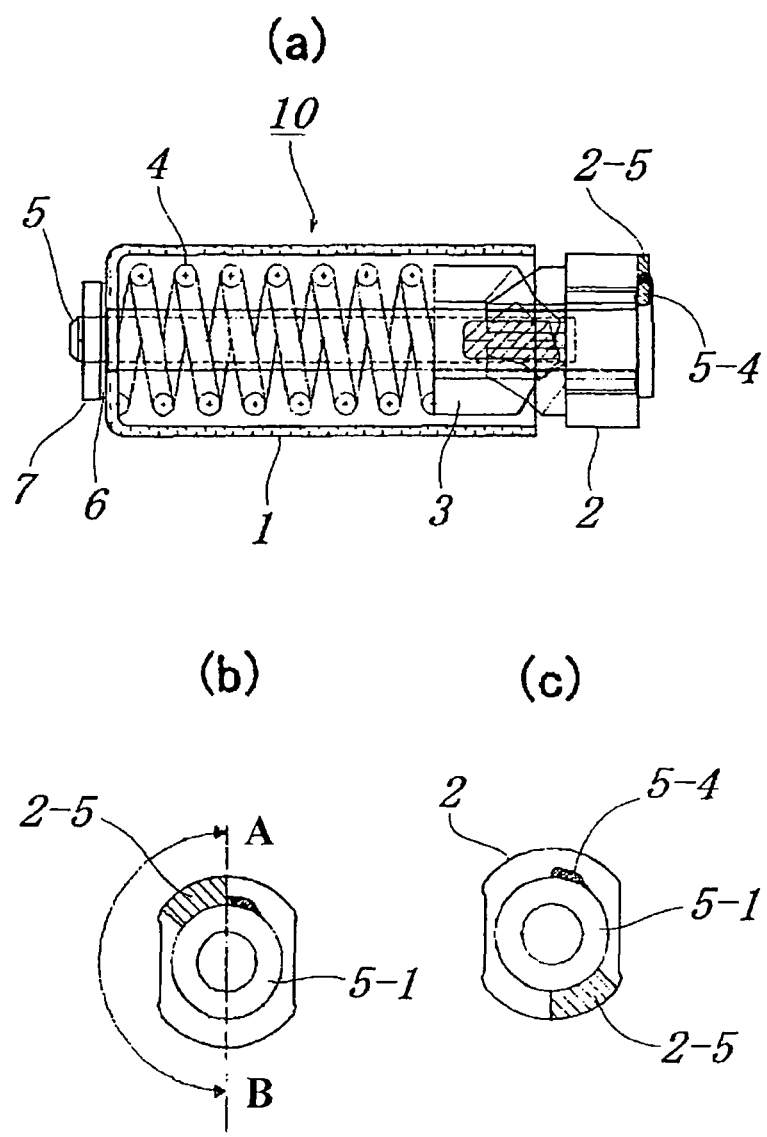
FIG. 7 shows an assembled state of the semi-automatic hinge according to Embodiment 1.

FIG. 7 shows a state in which the housing 1, first cam 2, second cam 3, coil spring 4, hinge shaft 5, sliding ring 6, and fixing plate 7 are assembled in the semi-automatic hinge 10 according to Embodiment 1. FIG. 7(a) is a front transparent view showing the internal state at a time in which the protruding body 2-1 of the first cam 2 is positioned in the deep valley portion 3-2 of the second cam 3, i.e., it has slid down the so-called slanted descending surface 3-1. FIG. 7(b) and FIG. 7(c) are right side views illustrating the generation of the rotational angle restricting function in the rotation of the first cam 2 and the hinge shaft 5. FIG. 7(b) shows the initial state wherein the hinge starts rotating. In this state, the protruding body 2-1 of the first cam 2 is at the slanted surface 3-3 of the second cam 3, and the first rotational angle restricting protrusion 5-4 disposed at the flange of the hinge shaft 5 and the second rotational angle restricting protrusion 2-5 of the first cam 2 collide and receive a rotational restriction, while demonstrating a suction force in point A. In the figure, the rotation of the first cam 2 from A toward B represents an opening direction, and the rotation from B toward A represents a closing direction. FIG. 7(c) illustrates a case in which the first cam 2 rotated through 180° with respect to the hinge shaft 5 and stopped in the state identical to that shown in FIG. 7(a). In the hinge according to Embodiment 1, the rotation range of the hinge shaft 5 is restricted within 180° of A to B shown in FIG. 7(b), and the rotation through 360° is not allowed.

Embodiment 2

Figure 8:
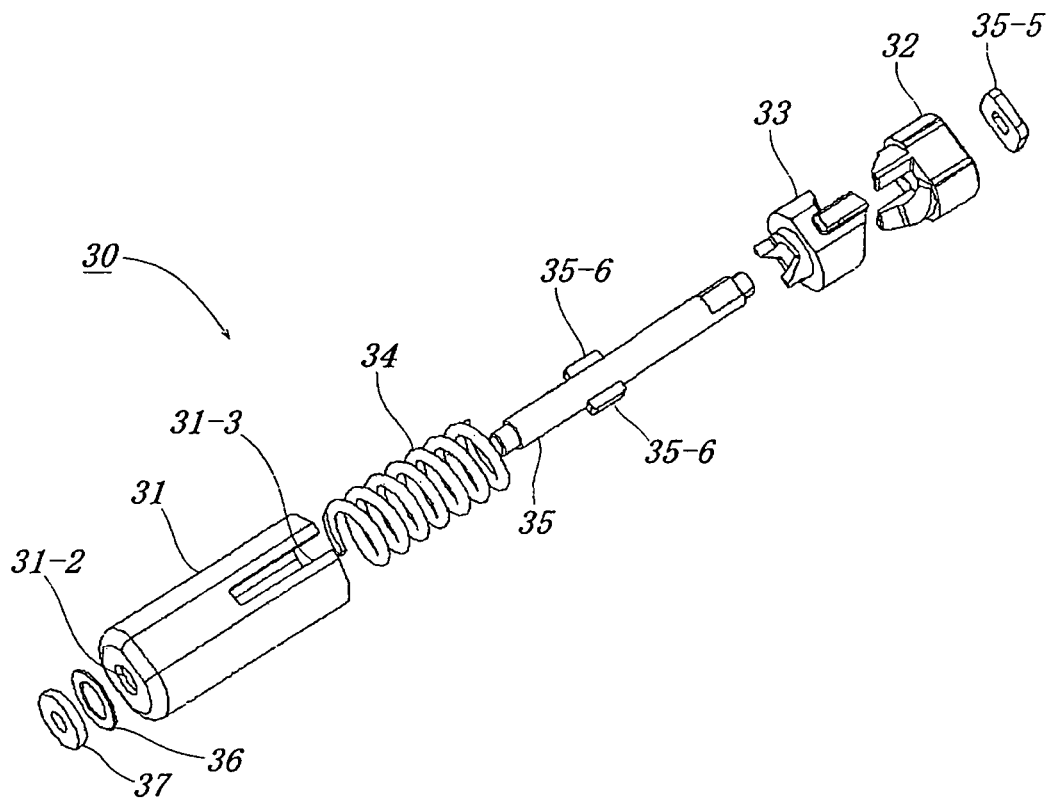
FIG. 8 is an exploded perspective view illustrating the semi-automatic hinge according to Embodiment 2.

FIG. 8 is an exploded perspective view illustrating the semi-automatic hinge according to Embodiment 2. As shown in FIG. 8, a semi-automatic hinge 30 according to the present embodiment is constituted by a housing 31, a first cam 32, a second cam 33, a coil spring 34, and a hinge shaft 35. As shown in the figure, the hinge 35 is successively passed through the first cam 32, the second cam 33, and the coil spring 34, and the right end of the hinge shaft 35 is fixed by a fixing plate 35-5. Further, the distal end of the hinge shaft 35 is inserted in a through hole 31-2 provided in the side wall of the housing 31, a sliding ring 36 is externally fitted thereon, and the end portion is fixed by the fixing plate 37. The coil spring 34 is disposed on the side opposite the abutment surface of the second cam 33 and impels a rotational torque by abutting the first cam 32 and the second cam 33 against each other.

The second cam 33 is pushed by the coil spring 34 and locked so as to be rotatable synchronously with the housing 31, but can move in the axial direction.

Figure 9:
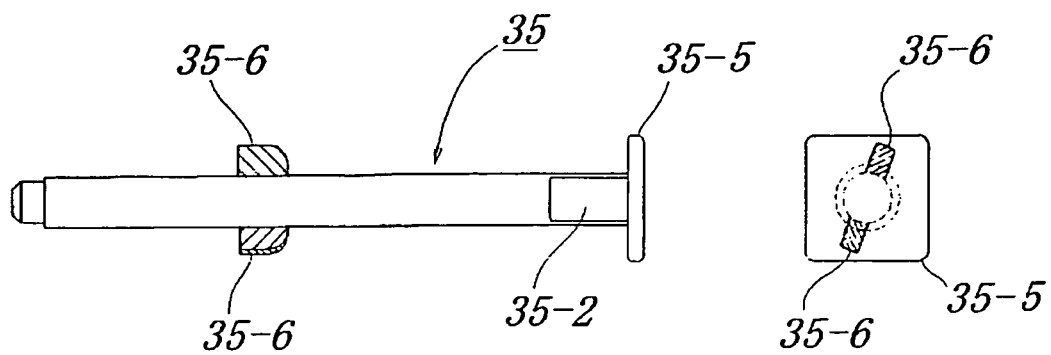
FIG. 9 illustrates the structure of the hinge shaft according to Embodiment 2.

FIG. 9 illustrates the structure of the hinge shaft 35. FIG. 9(a) is a front view and FIG. 9(b) is a left side view (partially viewable shape is shown by a dot line).

As shown in FIG. 9(a), the hinge shaft 35 used in Embodiment 2 has an end portion that is inserted at the left side surface into a through hole 31-2 provided in the side wall of the housing 31 and fixed by the fixing plate 37. The fixing plate 35-5 constituted by a separate member is fixedly attached to the right end. The proximity of the right end of the hinge shaft 35 is a D-cut sectional portion 35-2. A first rotational angle restricting protrusion 35-6 such as shown in the figure is formed at the axial circumferential surface of the hinge shaft 35.

As shown in FIG. 9(b), the first rotational angle restricting protrusion 35-6 is formed in two axially symmetrical locations. The fixing plate 35-5 of a substantially quadrangular shape is fixedly attached to the right end of the hinge shaft 35.

Figure 10:
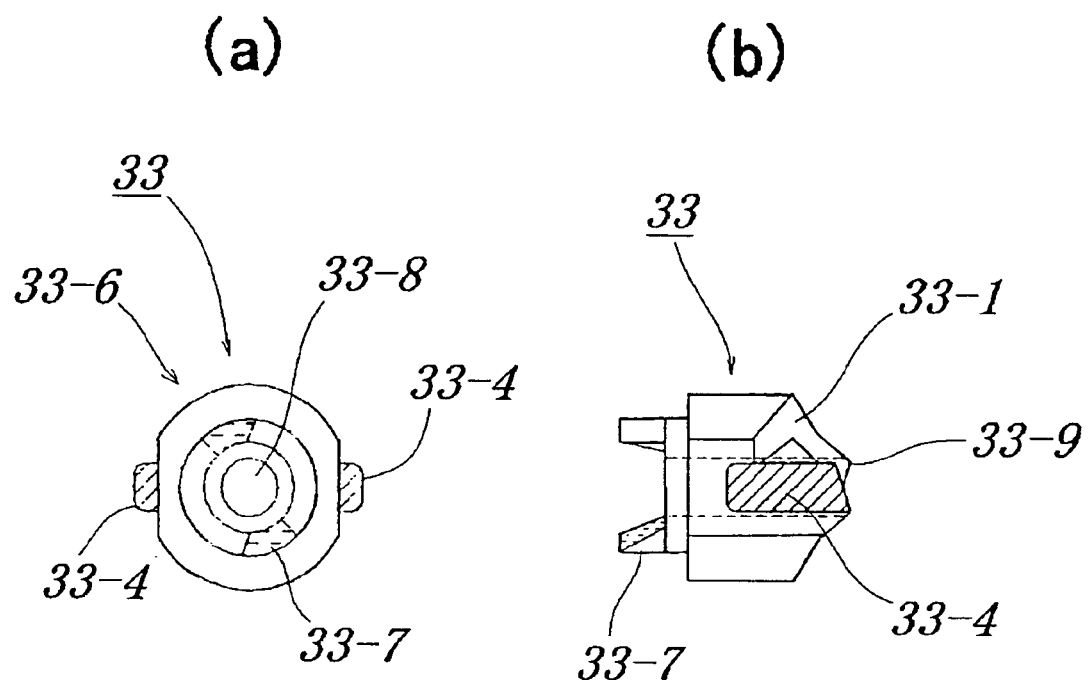
FIG. 10 shows the structure of the second cam according to Embodiment 2.

FIG. 10 shows the structure of the second cam 33. FIG. 10(a) is a left side view and FIG. 10(b) is a front view.

As shown in FIG. 10(a), a sliding protrusion 33-4 that engages with a guide groove 31-3 of the housing 31 is formed in the side surface of the second cam 33 used in Embodiment 2. Further, a concave-convex shape is formed at the surface of the second cam that abuts on the first cam 32, and a cam torque is generated by pressure applied by the coil spring 34.

A second rotational angle restricting protrusion 33-7 is formed at the left side surface of the second cam 33. The axial center of the second cam 33 has a cylindrical shape and does not rotate synchronously with the inserted hinge shaft 35.

Therefore, the first rotational angle restricting protrusion 35-6 formed at the hinge shaft 35 and the second rotational angle restricting protrusion 33-7 formed at the left side surface of the second cam 33 are thrust against each other by mutual rotation of the second cam 33 and the first rotational angle restricting protrusion 35-6 formed at the axial circumferential surface of the hinge shaft 35, thereby demonstrating the rotational angle restricting function.

Where the state with a closed liquid crystal portion is taken as a central angle of 0°, as shown in FIG. 10(b), the concave-convex shape of the second cam 33 is successively realized from 0° as a convex top portion 33-9, a slanted descending surface 33-1, and a deep valley portion (notched portion).

In Embodiment 2, the convex top portion 33-9 is formed at a position with a central angle of 20° to 40°. With such a configuration, the below-described protruding body of the first cam 32 is pressed at the slanted descending surface 33-1 by the coil spring 34, thereby generating a suction torque at the abutting surface of the cam.

The rotational angle restricting function is designed to be generated between the central angle 0° and the convex top portion 33-9 of the second cam 33.

In Embodiment 2, the effect produced by collision of the first rotational angle restricting protrusion 35-6 of the hinge shaft 35 and the second rotational angle restricting protrusion 33-7 of the second cam 33 is that the protruding body 32-1 of the first cam 32 is prevented from sliding down toward the notched portion of the second cam 33.

Further, the convex top portion 33-9 in Embodiment 2 is formed at a central angle of 20° to 40°, and where the protruding body of the first cam 32 passes by the convex top portion, a suction torque is generated in the slanted descending surface 33-1. Therefore, in a portable electronic device incorporating the semi-automatic hinge according to Embodiment 2, the automatic opening angle is equal to or less than half of the central angle 70° to 90°.

Figure 11:
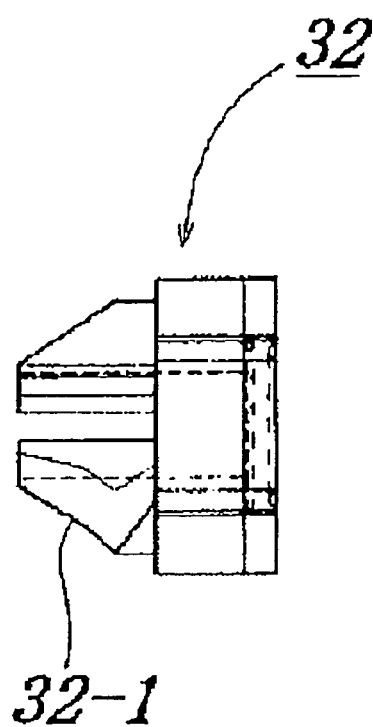
FIG. 11 illustrates the structure of the first cam according to Embodiment 2.
Figure 11:
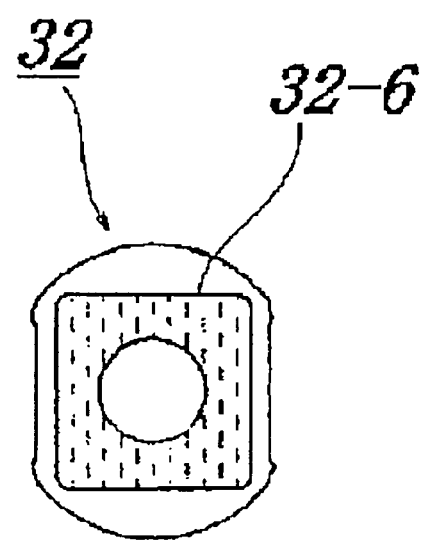

FIG. 11 illustrates the structure of the first cam 32. FIG. 11(a) is a front view, and FIG. 11(b) is a right side view.

As shown in FIG. 11(a), the first cam 32 used in Embodiment 2 has formed on the left side surface thereof a protruding body 32-1 abutting on the second cam 33. The through hole of the first cam 32 is formed in a cylindrical shape.

As shown in FIG. 11(b), a concave groove 32-6 of a substantially quadrangular shape is formed at the right side surface of the first cam 32. The fixing plate 35-5 of the above-described hinge shaft 35 mates with the concave groove 32-6, thereby enabling the synchronous rotation of the hinge shaft 35 and the first cam 32.

Figure 12:
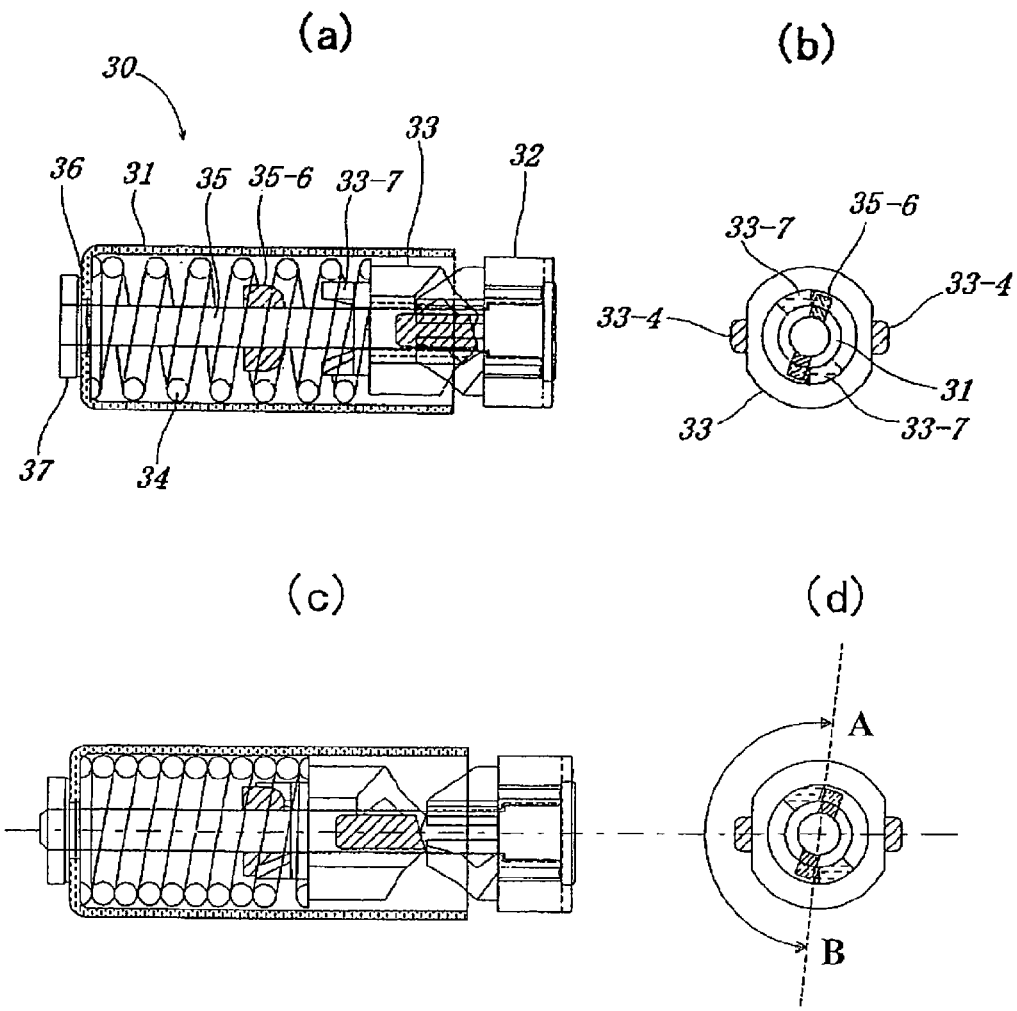
FIG. 12 shows an assembled state of the semi-automatic hinge according to Embodiment 2.

FIG. 12 shows a state in which the housing 31, first cam 32, second cam 33, coil spring 34, hinge shaft 35, sliding ring 36, and fixing plate 37 are assembled in the semi-automatic hinge 30 according to Embodiment 2. FIG. 12(a) is a front transparent view showing the internal state in which the protruding body 32-1 of the first cam 32 has fallen into the deep valley portion of the second cam 33 and the hinge has opened. FIG. 12(b) is a schematic diagram illustrating, from the fixing plate 37 side, the mutual arrangement of the second rotational angle restricting protrusion 33-7 disposed at the second cam 33 and the first rotational angle restricting protrusion 35-6 disposed at the hinge shaft 35 in the state shown in FIG. 12(a). FIG. 12(a) and FIG. 12(b) clearly show that the first rotational angle restricting protrusion 35-6 and the second rotational angle restricting protrusion 33-7 are at positions that are apart from each other and do not receive the rotation angle restriction.

FIG. 12(c) illustrates the state in which due to the closing operation of the hinge the protruding body of the first cam 32 rises the oblique descending surface 33-1 of the second cam 33, the coil spring 34 is compressed to a maximum, a large repulsion force is demonstrated, and the protruding body of the first cam 32 and the convex top portion of the second cam 33 are abutted on each other and positioned in a closed state (rotation start site). Due to the compression of the second cam 33 in the axial direction of the hinge shaft 35, the second rotational angle restricting protrusion 33-7 also moves, the first rotational angle restricting protrusion 35-6 and the second rotational angle restricting protrusion 33-7 abut on each other, and the rotational angle restricting mechanism operates. FIG. 12(d) is a schematic drawing illustrating, from the fixing plate 37 side, the state in which the rotational angle restriction shown in FIG. 12(c) is implemented. The second rotational angle restricting protrusion 33-7 of the second cam 33 abuts in point A on the first rotational angle restricting protrusion 35-6 disposed obliquely with respect to the hinge shaft 35, and the second cam 33 is prevented from moving beyond the point A, which is shown by an arrow, and sliding down. Where the rotating shaft 35 of the hinge is fixed and only the rotating cam 33 rotates in FIG. 12(c), the state shown in FIG. 12(a) and FIG. 12(b) is assumed in which the A point is a rotation start portion and the B point is a position after rotation through 180°.

Embodiment 3

Figure 13:
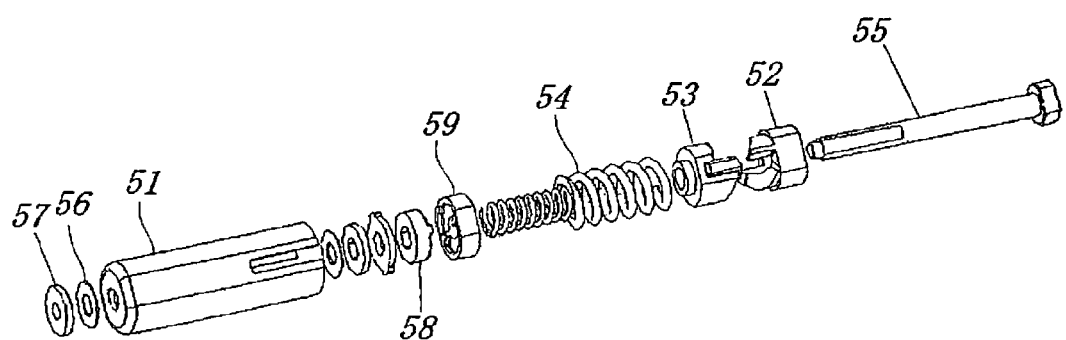
FIG. 13 is an exploded perspective view illustrating the semi-automatic hinge according to Embodiment 3.

FIG. 13 is an exploded perspective view illustrating the semi-automatic hinge according to Embodiment 3. As shown in FIG. 13, a semi-automatic hinge 50 according to the present embodiment, is constituted by a housing 51, a first cam 52, a second cam 53, a coil spring 54, a hinge shaft 55, a rotational angle restricting fixed cam 58, and a rotational angle restricting rotating cam 59.

As shown in the figure, the hinge shaft 55 is passed through the first cam 52, second cam 53, coil spring 54, rotational angle restricting rotating cam 59, and rotational angle restricting fixed cam 58 in the order of description, the distal end of the hinge shaft 55 is inserted into a through hole provided in the side wall of the housing 51, a sliding ring 56 is externally fitted thereon, and the end portion is fixed by a fixing plate 57. The coil spring 54 is disposed between the second cam 53 and the rotational angle restricting rotating cam 59, and a rotation torque is impelled by abutting the first cam 52 and the second cam 53 on each other and by abutting the rotational angle restricting fixed cam 58 and the rotational angle restricting rotating cam 59 on each other.

The second cam 53 is pushed by the coil spring 54 and locked so as to be rotatable synchronously with the housing 51, but can move in the axial direction.

Figure 14:
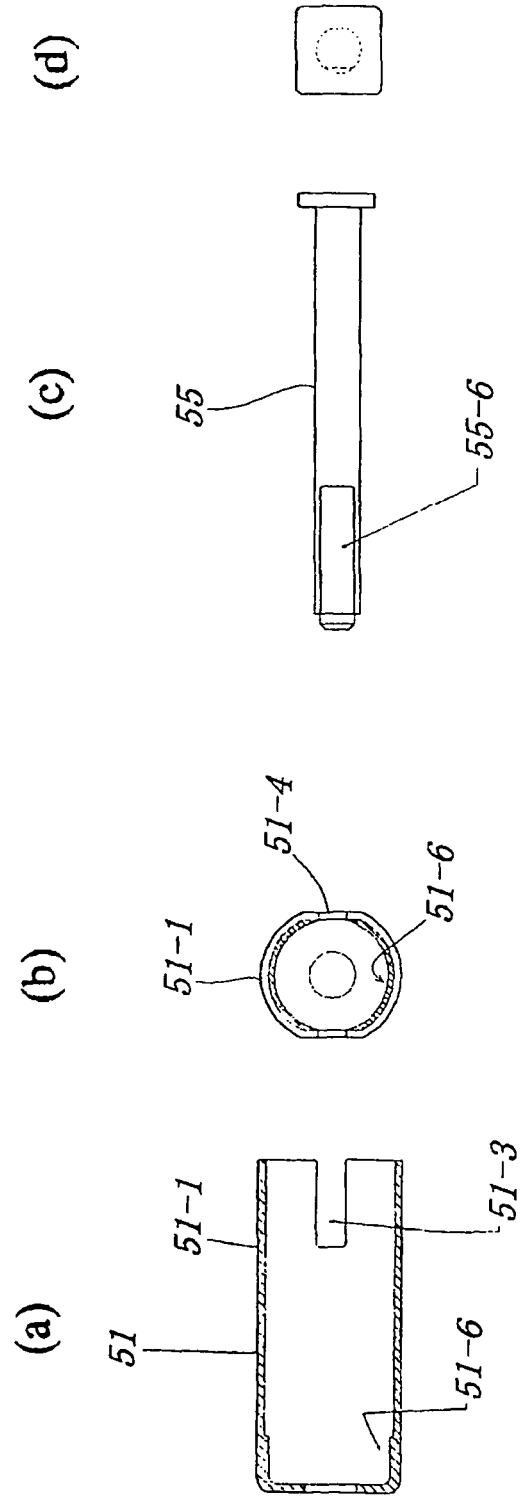
FIG. 14 illustrates the structure of the housing and the hinge shaft according to Embodiment 3.

FIG. 14 illustrates the structure of the housing 51 and the hinge shaft 55. FIG. 14(a) is a cross-sectional view of the housing 51. FIG. 14(b) is a right side view of the housing 51. FIG. 14(c) is a front view of the hinge shaft 55. FIG. 14(d) is a right side view of the hinge shaft 55.

As shown in FIG. 14(a), the housing 51 used in Embodiment 3 has a through hole for inserting the hinge shaft 55 in the side wall. Further, guide grooves 51-3 that guide the movement of the second cam 53 in the axial direction are provided in two locations on the circumferential surface of the opening of the housing 51. The reference numeral 51-6 stands for a convex portion restricting the movement of the rotational angle restricting rotating cam 59 in the axial direction.

As shown in FIG. 14(b), the upper surface and bottom surface of the housing 51 are curved, but both side surfaces are flat and smooth portions 51-4.

As shown in FIG. 14(c), the hinge shaft 55 used in Embodiment 3 has an end portion that is inserted at the side surface into the through hole provided in the side wall of the housing 51 and fixed by the fixing plate 57. The proximity of the left end of the hinge shaft 55 is a D-cut sectional portion 55-6. This D-cut sectional portion 55-6 serves as a mechanism for synchronizing the rotation of the rotational angle restricting fixed cam 58 with the hinge shaft 55.

Further, as shown in FIG. 14(d), a substantially quadrangular flange 55-7 is formed at the right ends of the hinge shafts 55. This flange is mated with and fixed to the first cam 52.

Figure 15:
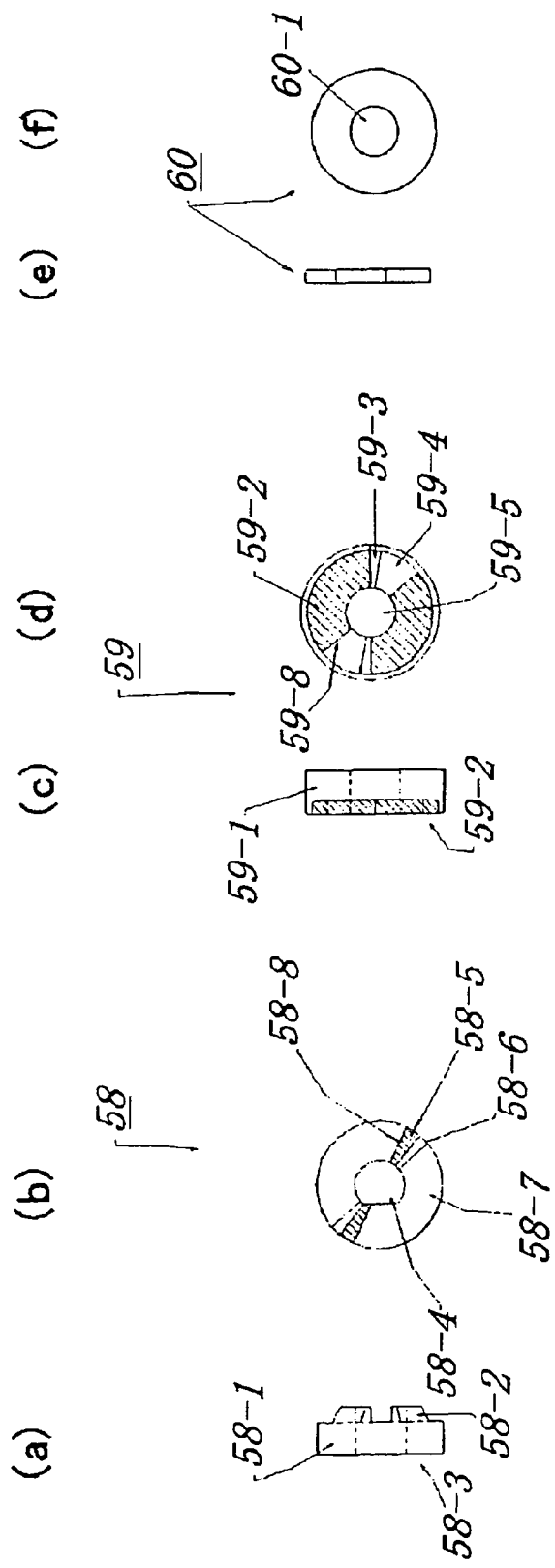
FIG. 15 is an explanatory drawing relating to members that generate a rotation angle restricting function according to Embodiment 3.

FIG. 15 is an explanatory drawing relating to members that generate a rotation angle restricting function. FIG. 15(a) is a plan view of the rotational angle restricting fixed cam 58. FIG. 15(b) is a side view of the rotational angle restricting fixed cam 58. FIG. 15(c) is a plan view of the rotational angle restricting rotating cam 59. FIG. 15(d) is a side view of the rotational angle restricting rotating cam 59. FIG. 15(e) is a front view of a torque plate 60. FIG. 15(f) is a side view of the torque plate.

As shown in FIG. 15(a), the rotational angle restricting fixed cam 58 has a convex portion 58-2 and a flat and smooth portion 58-7 on the side surface. As shown in FIG. 15(b), a through hole 58-4 is formed in the center of the rotational angle restricting fixed cam 58. This through hole 58-4 has a D-cut cross section and by mating with the D-cut cross section 55-6 of the hinge shaft 55 enables the hinge shaft 55 and the rotational angle restricting fixed cam 58 to rotate synchronously. Further, the convex portion 58-2 of the rotational angle restricting fixed cam 58 is constituted by a protrusion 58-5, shown by hatching in FIG. 15(b), and a slanted surface 58-6.

As shown in FIG. 15(c), in the rotational angle restricting rotating cam 59, the surface abutting on the rotational angle restricting fixed cam 58 is a concave groove 59-2. As shown in FIG. 15(d), the concave groove 59-2 has a convex portion 59-4, the concave portion 59-2, and the slanted surface 59-3.

In Embodiment 3, the region where rotation is possible is formed by collision of the rotational angle restricting rotating cam 59 and the rotational angle restricting fixed cam 58, more specifically by joining of the protrusion 58-5 of the rotational angle restricting fixed cam 58 and the concave portion 59-2 of the rotational angle restricting rotating cam 59. In greater detail, the state in which an end portion 58-8 of the protrusion 58-5 of the rotational angle restricting fixed cam 58 and an end portion 59-8 of the concave portion 59-2 of the rotational angle restricting rotating cam 59 abut on each other corresponds to a rotational angle restriction position in which downward slip between the first cam 52 and the second cam 53 is prevented.

Figure 16:
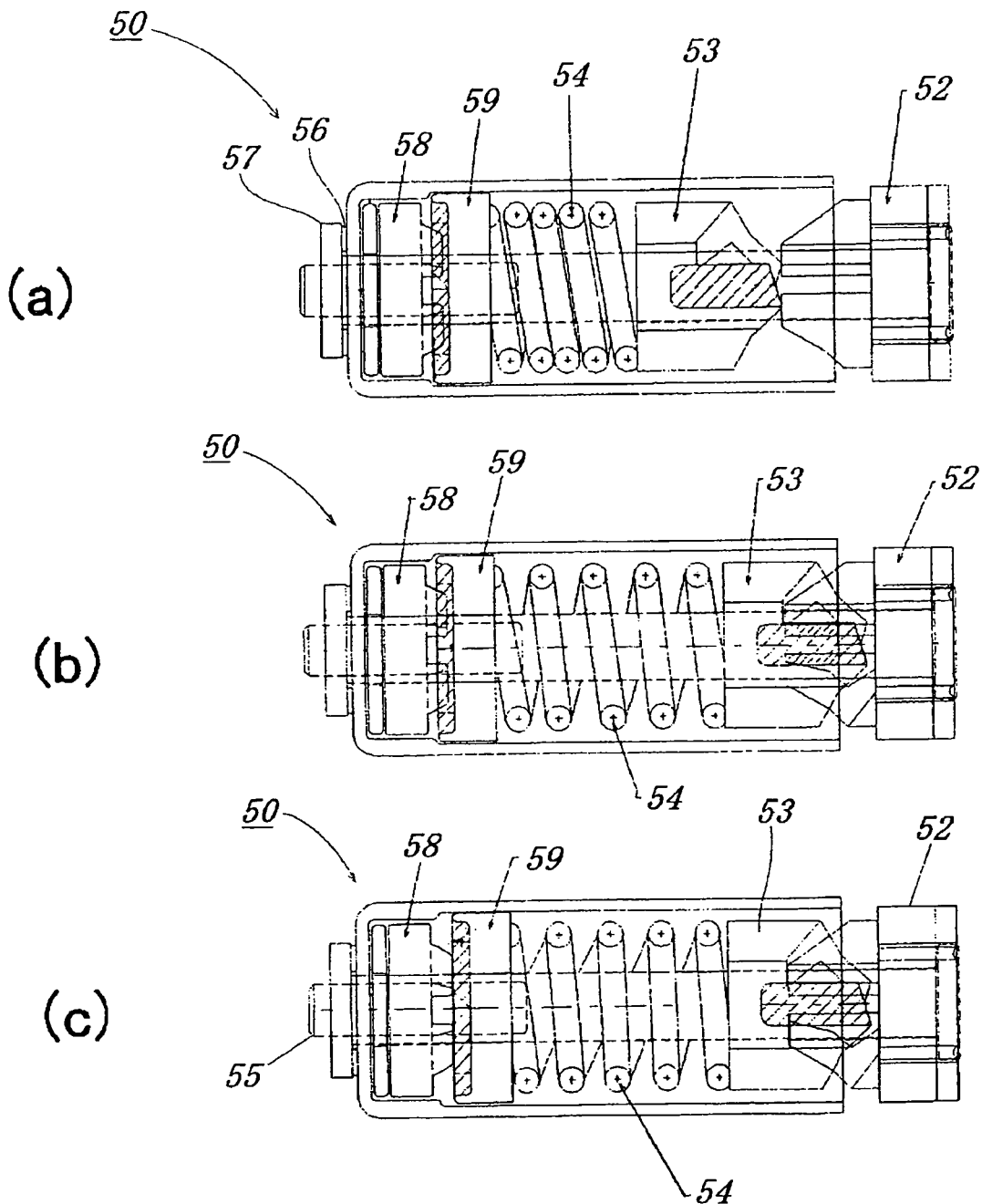
FIG. 16 is a front transparent view illustrating the operation of the semi-automatic hinge according to Embodiment 3.
Figure 17:
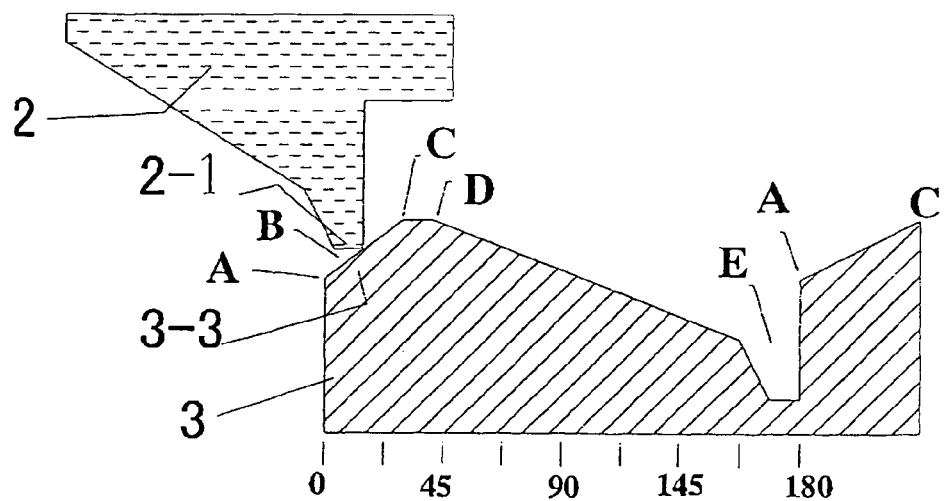
FIG. 17 is a conceptual drawing illustrating the torque generating mechanism and rotational angle restricting function in the semi-automatic hinges according to Embodiments 1, 2, and 3.

FIG. 16 is a front transparent view illustrating the operation of the semi-automatic hinge according to Embodiment 3. FIG. 16(a) shows a case in which the hinge is closed and an initial rotation position is assumed in which the first cam 52 has raised the slanted descending surface of the second cam 53 and the coil spring 54 has been compressed. In this state the rotational angle restricting fixed cam 58 and the rotational angle restricting rotating cam 59 are in the above-described rotational angle restricting position.

FIG. 16(b) shows a position in which the hinge has rotated and the slanted surface 58-6 of the rotational angle restricting fixed cam 58 and the slanted surface 59-3 of the rotational angle restricting rotating cam 59 are abutted on each other. It is clear that the coil spring 54 shown in the figure is released from the maximum compression position by the rotation of the hinge.

FIG. 16(c) shows the latter half of the rotational angle of the semi-automatic hinge and illustrates an example of a hinge in which a free stop operation is added by a friction torque generated when the protrusion (58-5 and 59-4) of the rotational angle restricting fixed cam 58 and the rotational angle restricting rotating cam 59 abut on each other and move rotationally.

Figure 18:
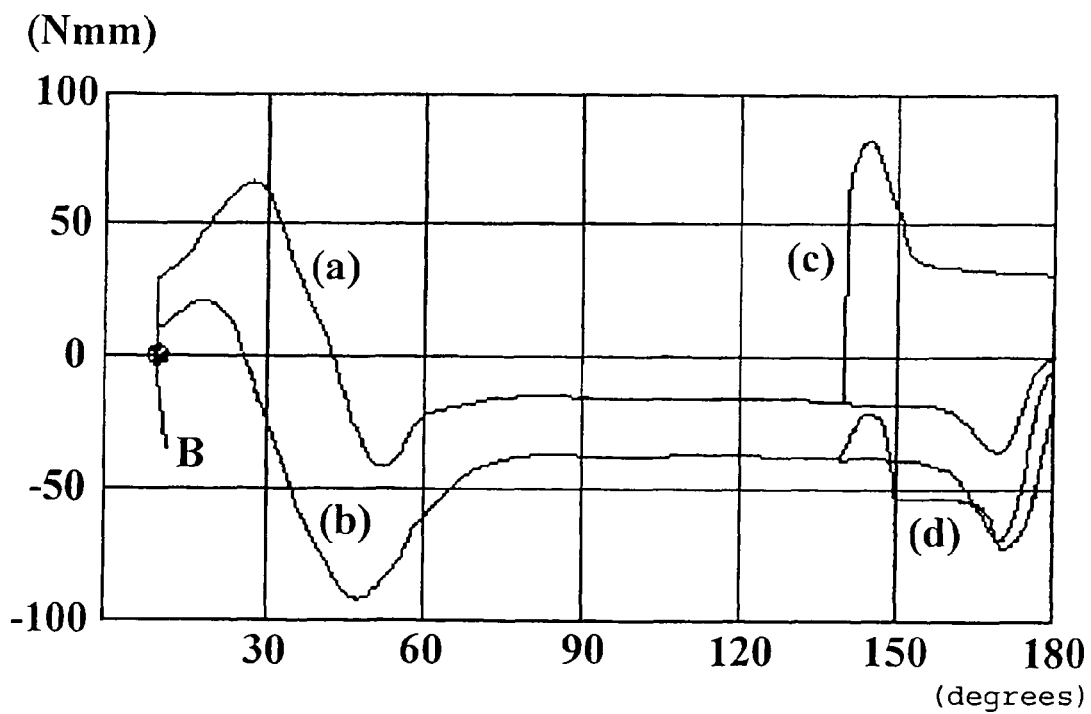
FIG. 18 is a graph illustrating the relationship between a rotational angle and a torque curve common to the semi-automatic hinges according to Embodiments 1, 2, and 3.

FIG. 18 is a graph illustrating the relationship between a rotational angle and a torque value in the semi-automatic hinge according to Embodiments 1, 2, and 3. The curve (a) is a graph illustrating an opening operation, and the curve (b) is a graph illustrating a closing operation. The curve (c) and the curve (d) relate only to Embodiment 3 and show the trajectory obtained in the case in which a free stop operation is added from the vicinity of 135°. A mode is shown in which the rotation angle restriction in accordance with the present invention is demonstrated in point B (about 10°) and the hinge cannot rotate from the point B to a 0 degree side.

In the hinge having the curve characteristic shown in FIG. 18, the torque variation point is close to 45 degrees. Therefore, assuming that the hinge is incorporated in the actual cellular phone, the passive region before the point B (10 degrees) becomes an attachment offset. Therefore, the angle at which the operation of opening the housing at the liquid crystal side is started automatically is 45−10=35°. Likewise, on the closing side, the variation point is about 28° and therefore the angle is 28−10=18°. This is equal to or less than half of the angle in the conventional devices.

Therefore, the effect obtained in the portable electronic device incorporating the semi-automatic hinge according to Embodiment 1, 2, or 3 is that the angle of automatic opening can be equal to or less than half of the central angle of 70° to 90°, and the angle at which automatic closing is started can be equal to or less than half of 70° to 60°.

INDUSTRIAL APPLICABILITY

The semi-automatic hinge in accordance with the present invention can be used in a wide variety of portable electronic devices. In particular, it can be optimally used in cellular phones.

EXPLANATION OF REFERENCE NUMERALS 1, 31, 51 housings
2, 32, 52 first cams
2-1 protruding body
2-5, 33-7 second rotational angle restricting protrusions
3, 33, 53 second cams
3-2 deep valley portion
3-1, 3-7 slanted descending surfaces
3-9 convex top portion
4, 34, 54 elastic members
5, 35, 55 hinge shafts
5-1 flange
5-4, 35-6 first rotational angle restricting protrusion
6, 36 sliding ring
7, 37 fixing plate
10, 30, 50 semi-automatic hinges
58 rotation angle restricting fixed cam
59 rotational angle restricting rotating cam

The invention claimed is:

1. A single-shaft semi-automatic hinge for a portable electronic device in which a main body portion and a liquid crystal portion can be folded, wherein a first cam and a second cam fitted on a single hinge shaft of the hinge passing therethrough are abutted on each other with pressure application by an elastic member, thereby generating a rotational friction torque; a region of the first cam and the second cam in which the liquid crystal portion can rotate from a state in which the main body portion and the liquid crystal portion are folded to a fully open state is set narrower than a region in which the hinge can rotate; a protruding body is formed on an abutment surface of the first cam; in a central angle range of 0° to 180° of an abutment surface of the second cam, a notched portion is formed at 0° and then a slanted surface, a convex top portion, a highly slanted surface, a slanted descending surface, and a deep valley portion are formed successively in the rotation direction in the order of description from the rotation start site and the convex top portion is provided at a central angle of less than 50°; and a rotational angle restricting function, which prevents the protruding body of the first cam from sliding down into the notched portion of the second cam when the main body portion and the liquid crystal portion are folded, is formed between a central angle of 0° and the convex top portion in which the first and second cams each respectively have the same symmetry about 180°, wherein the hinge shaft has a flange formed at one end thereof, is inserted in a housing and is passed through at least the first cam, the second cam, and the elastic member; the second cam is locked to the housing so as to be rotatable synchronously with the housing; and the rotational angle restricting function is generated by rotating the first cam and the flange of the hinge shaft relative to each other while abutting against each other, and causing contact of a first rotational angle restricting protrusion formed at the flange of the hinge shaft with a second rotational angle restricting protrusion formed on the surface opposite the abutment surface of the first cam, thereby preventing the protruding body of the first cam from sliding down into the notched portion of the second cam.

2. The semi-automatic hinge according to claim 1, wherein the slanted surface, the convex top portion, the highly slanted surface, the slanted descending portion, and the deep valley portion are disposed with 180° symmetry along the radial circumference; and the convex top portion of the second cam is disposed at two positions with a central angle of 20° to 40° and 200° to 220°, and the deep valley portion is disposed at two positions with a central angle of 150° to 180° and 330° to 360°.

3. The semi-automatic hinge according to claim 2, wherein the rotational angle restricting function is formed at two positions with a central angle of 0° to 15° and 180° to 195° with 180° symmetry.

* * * * *